Oct. 26, 1965     F. R. YOST ETAL     3,213,976
BRAKE PROTECTION MECHANISM
Filed Dec. 10, 1963
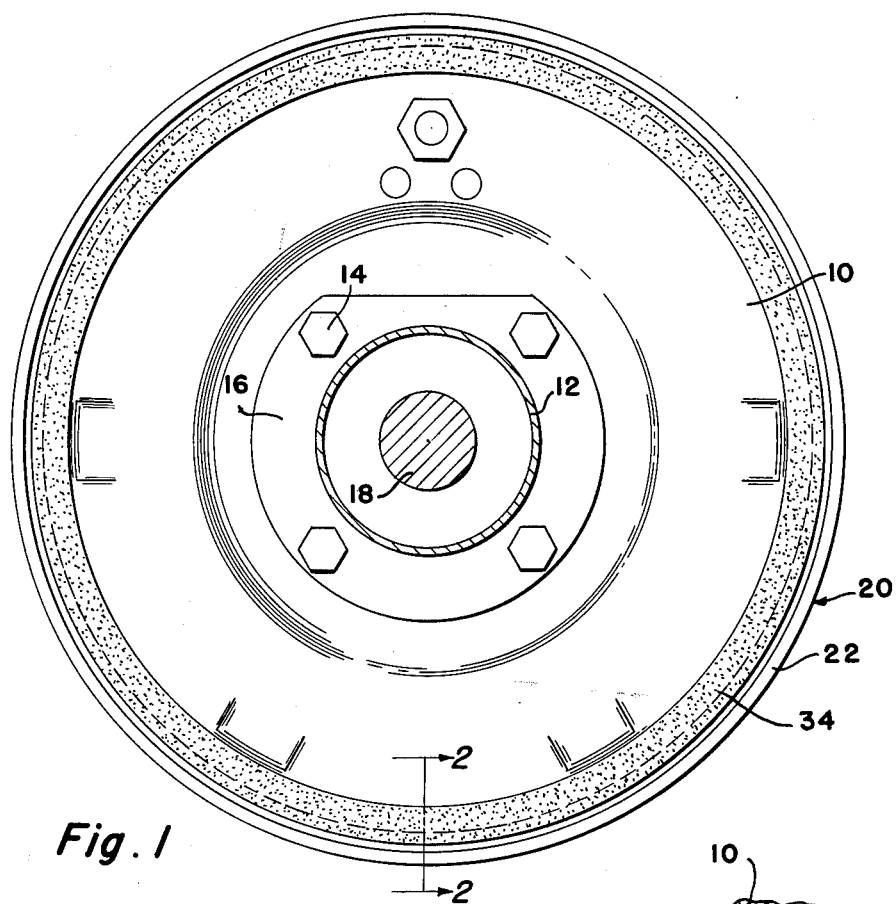
Fig. 1
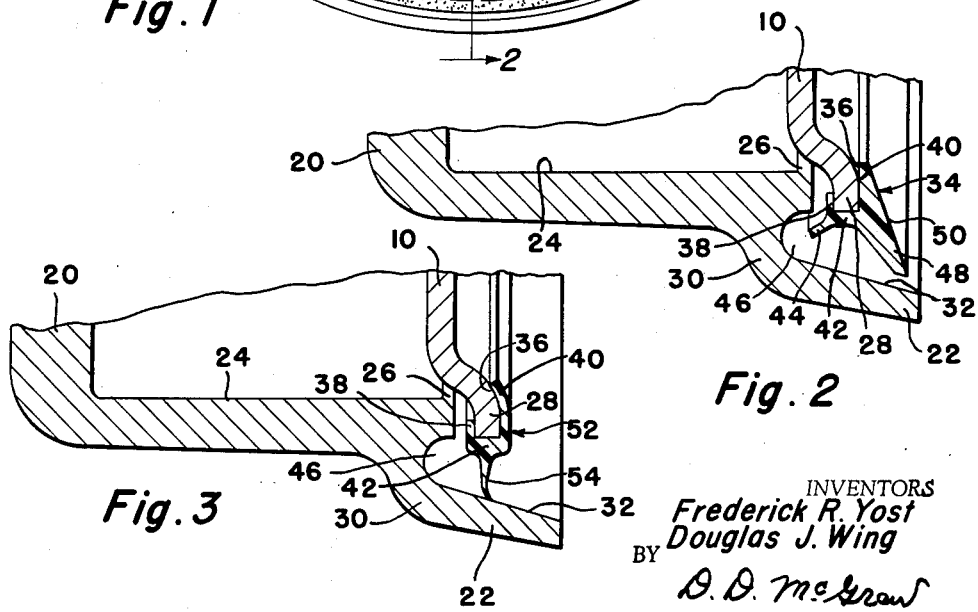
Fig. 2
Fig. 3
INVENTORS
Frederick R. Yost
Douglas J. Wing
BY
D. D. McGraw
Their Attorney 
United States Patent Office 3,213,976
Patented Oct. 26, 1965

3,213,976
BRAKE PROTECTION MECHANISM
Frederick R. Yost, Dayton, Ohio, and Douglas J. Wing, St. Clair Shores, Mich., assignors to General Motors Corporation, Detroit, Mich., a corporation of Delaware
Filed Dec. 10, 1963, Ser. No. 329,441
2 Claims. (Cl. 188—218)

The invention relates to a structure for protecting the interior of vehicle brake assemblies and more particularly to a brake splash guard or a seal arrangement which permits brake drum rotation while inhibiting the introduction of foreign matter into the interior of the drum between the drum and the backing plate. In order to seal the space between the drum and the backing plate from the introduction of such foreign matter such as dirt and water, consideration must be given to air movement and to the relationship of a seal provided between relatively rotating parts. Mechanisms of the type embodying the invention must be easily installed and require minimum maintenance. They must not require critical adjustment and should preferably be self-adjusting in their sealing relationships. The mechanism herein disclosed and claimed meets the above requirements, with one embodiment being fully self-adjustable after installation and another embodiment having such a structure interrelated with the brake drum and backing plate structure as to require no critical adjustments. The seal utilized is maintenance free in its operation and will provide for adequate cooling air circulation while effectively preventing the contamination of the interior of the brake drum.

In one of the embodiments, an annular seal body is provided with an annular mounting groove which receives the outer periphery of the backing plate, and a radially extending lip which extends into engagement with a flange formed on the brake drum and readily adjusts permanently to the installation by wearing during the initial periods of operation of the vehicle wherein the drum is rotated. Another embodiment of the invention utilizes oppositely flared and extending lips which cooperate with the drum and drum flange structure to provide a tortuous air passage and also act to deflect foreign matter away from the drum so that currents of air are readily circulated while effectively limiting the introduction of deleterious matter. The flange formed on the brake drum further assists in the removal of such matter before it has an opportunity to enter the interior of the drum.

In the drawing:
FIGURE 1 is an elevation view of mechanism embodying the invention.
FIGURE 2 is a partial section view illustrating the invention in greater detail and taken in the direction of arrows 2—2 of FIGURE 1.
FIGURE 3 is a view similar to FIGURE 2 and illustrates another modification embodying the invention.

The view of the mechanism as seen in FIGURE 1 is taken from a point intermediate the center line of the vehicle and one of the wheels so that the inner side of the backing plate 10 is seen. This plate is bolted to the axle housing 12 by suitable bolts 14 which extend through the axle housing flange 16 and bolt holes provided adjacent the inner periphery of the backing plate. The vehicle axle 18 extends through the housing 12 and a wheel and drum assembly is suitably mounted on the outer end of the axle in a conventional manner. The drum 20 has an outer peripheral flange 22 which is positioned radially outward and overlaps the outer periphery of the backing plate 10.

As is better illustrated in FIGURES 2 and 3, the drum 20 has a friction inner surface 24 which is adapted to be engaged by brake shoes when the vehicle brakes are operated. The backing plate 10 extends radially outward to a point adjacent but radially inward of the open end 26 of the drum and is then provided with an off-set flange 28 on its outer periphery. This flange extends radially outward to a circumference beyond the drum friction surface 24 and axially displaced from the outer end 26 thereof. The drum flange 22 extends first radially outward, as illustrated by its section 30 adjacent the drum open end 26, and then extends axially in a flared manner so that it has a flared inner surface 32 positioned radially and axially beyond and spaced from the backing plate flange 28.

The seal 34 is provided with an inner facing annular groove 36 defined by side walls 38 and 40 and the axially extending portion 42 of the seal body. To this extent the seal of FIGURE 2 and the seal of FIGURE 3 are similar.

The seal 34 of FIGURE 2 has an annular lip 44 which extends radially and axially outward so that it has a flared configuration which when installed extends toward the drum flange section 30 so that it extends into the recess 46 formed by the flange 22 and the main portion of the drum 20 on which the friction surface 24 is provided. Seal 34 is provided with another lip 48 having an annular configuration and extending radially and axially outward in a direction generally away from lip 44 so that it approaches the drum flange surface 32. Lip 48 and side wall 40 of the seal may have a common outer surface 50 which gives a somewhat beveled configuration to the outer portion of the seal. Lip 48 extends somewhat further radially outward than lip 44 since it must approach the flange surface 32 at a point wherein the drum flange has a greater radius than it does adjacent lip 44.

When the vehicle is being operated and drum 20 is being rotated, foreign matter such as oil, dirt, dust, water, sticks, gravel, etc. are often thrown toward the interior of the drum either by the wheel and tire associated with the particular drum or in many instances by other wheels and tires on the vehicle, or other vehicles. The brake drum flange 22 operates as a circumferentially acting rotating flinger which effectively removes much of the foreign matter before it has an opportunity to enter into the interior of the drum between the drum and the backing plate. The lip 48 of the seal 34 discourages further entry of such matter. A tortuous air passage is provided around the lip 44 through recess 46 and then around the brake drum end 26 between off-set flange 28 of the backing plate and lip 48 so that the entry of foreign matter is effectively excluded. At the same time the spacing of the backing plate and the drum and the lips 44 and 48 of the seal 34 permit the circulation of air currents so that the cooling of the brake interior is not inhibited.

The modification illustrated in FIGURE 3 includes the seal 52 which may have its side wall 40 formed so that it more closely conforms to the surface of the backing plate flange 28 than does the side wall 40 of seal 34. This gives a flared or outwardly beveled configuration to this portion of the seal. The axially extending portion 42 of the seal 52 has a generally radially extending annular lip 54 formed thereon which, when the seal 52 is fixed on the backing plate and the drum is in its operating condition, engages the surface 32 of the brake drum flange 22. Lip 54 may have sufficient radial length so as to be slightly bent at this time. The lip is preferably made of such a material, however, that the material is eroded or consumed during rotation of the brake drum until the lip terminates at the surface 32 without dragging thereon after a short period of operation. This provides a seal which adjusts itself to the particular drum and backing plate spacing and effectively prevents the entry of foreign matter into the drum at all times. The lip is preferably sufficiently flexible so that when air contained in the drum is quickly heated due to operation of the brakes, its expansion may be taken care of by slight flexing of the lip 54 to permit escape along the inner surface 32 of the flange 22.

It can be readily seen that the structure embodying the invention illustrated and described above may be installed quickly and economically, requires no adjustments, does not drag on the rotating drum for extended periods of time and never generates unnecessary heat, permits the circulation of air currents within and from the interior of the drum while effectively screening the introduction of foreign matter, and cooperates with the drum cooling flange in the performance of these functions so as to keep the drum interior free of contamination.

In the claims:

1. A brake assembly comprising, a backing plate and a rotatable drum having a cooling flange extending radially beyond said backing plate and a flexible seal having an annular groove therein receiving the outer periphery of said backing plate and having flexible and consumable lip means extending toward said brake cooling flange, said lip means being initially engageable with said cooling flange and eroded under brake drum rotation to establish a minimum clearance condition after a period of operation.

2. In a brake assembly having a rotatable open end brake drum provided with an inner friction surface and a flange extending first radially and then axially and radially from the drum open end, a non-rotatable backing plate substantially filling the drum open end and having an outer peripheral flange formed thereon extending radially beyond the drum friction inner surface and terminating in spaced relation to said flange radially inward of the axially and radially extending portion thereof, and seal means secured to the outer periphery of said backing plate and having flexible lip means extending toward said flange at an acute angle to the flange inner surface on the side of said lip means toward the drum open end and sealing the interior of said brake drum against the introduction of foreign matter, said seal means' lip means being provided initially in engaging relation with said flange and during a short rotational period of said drum being worn to provide minimum clearance therewith.

References Cited by the Examiner

UNITED STATES PATENTS

| | | | |
|---|---|---|---|
| 1,923,086 | 8/33 | Givens | 188—218 |
| 1,995,691 | 3/35 | Stough et al. | 188—218 |
| 2,826,441 | 3/58 | Niessen | 277—178 |
| 2,994,571 | 8/61 | Peras | 277—178 |
| 3,005,648 | 10/61 | Christensen | 277—178 |

FOREIGN PATENTS

| | | |
|---|---|---|
| 50,993 | 2/41 | France. |
| 1,226,608 | 2/60 | France. |
| 539,512 | 2/56 | Italy. |

ARTHUR L. LA POINT, *Primary Examiner.*

EUGENE G. BOTZ, *Examiner.*